Feb. 23, 1960   W. H. McCORKLE   2,926,127
NEUTRONIC REACTOR WITH ACCESSIBLE THIMBLE
AND EMERGENCY COOLING FEATURES
Filed March 25, 1957   4 Sheets-Sheet 2
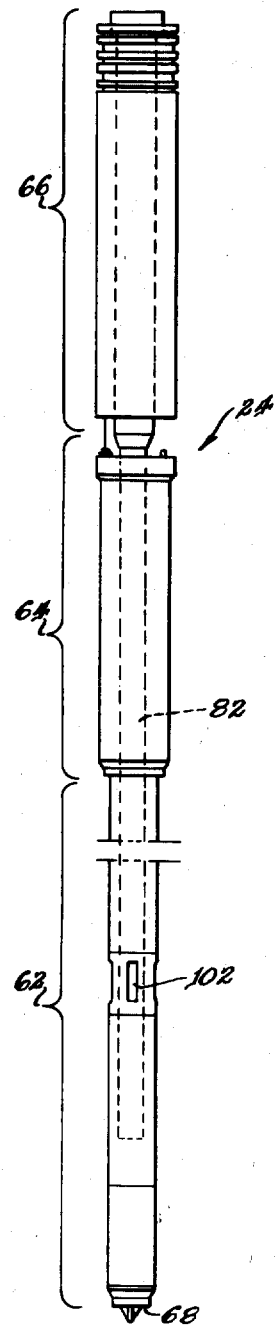
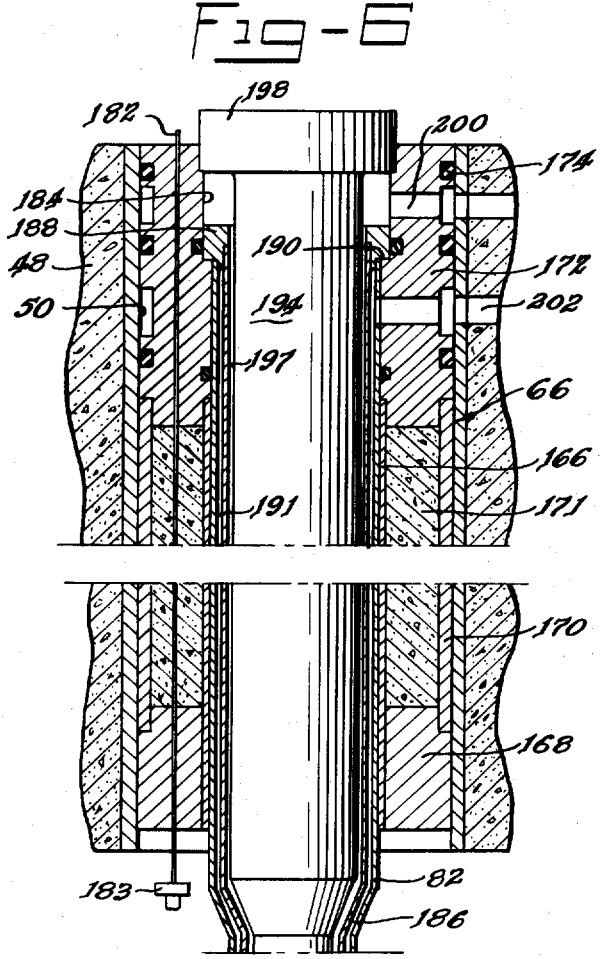
INVENTOR.
Willard H. McCorkle
BY
Attorney

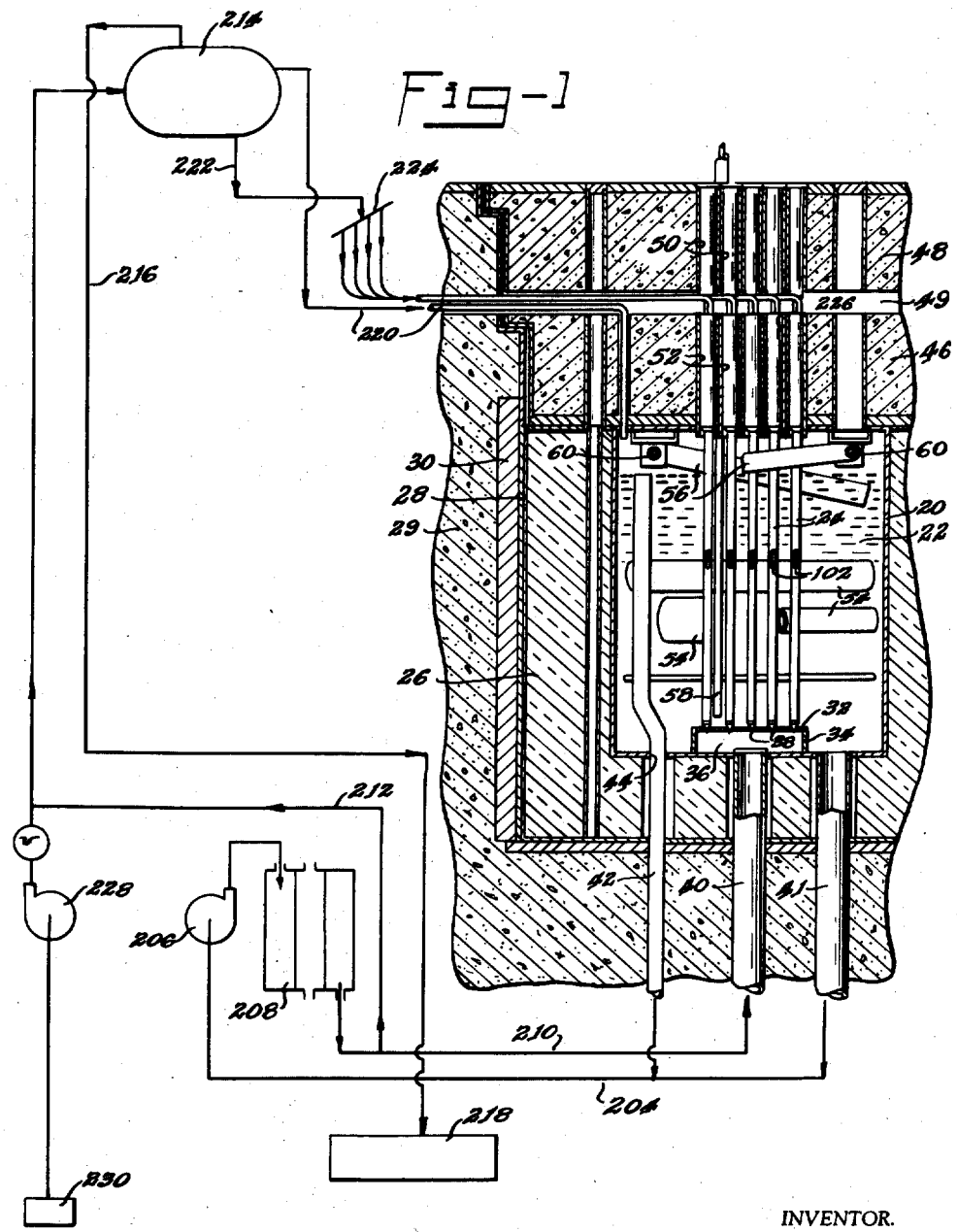

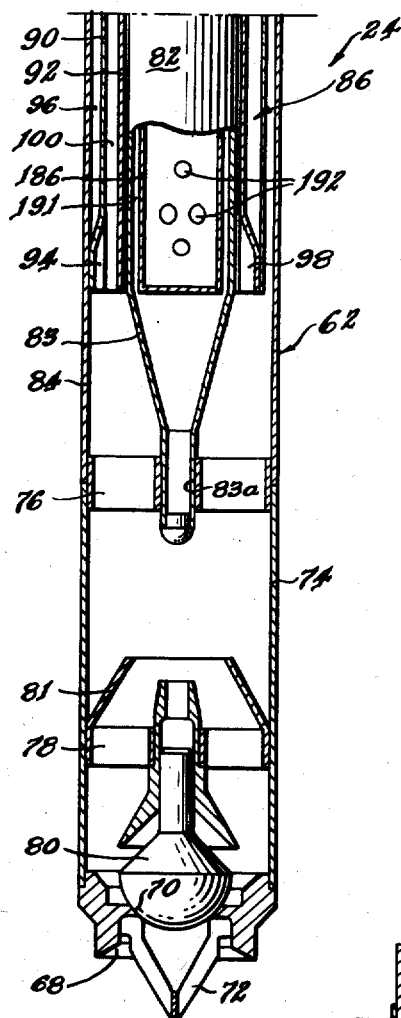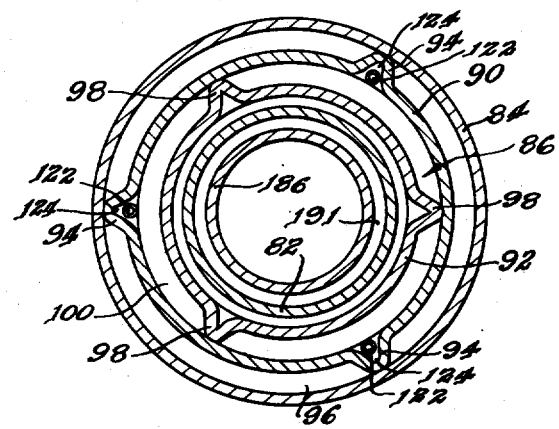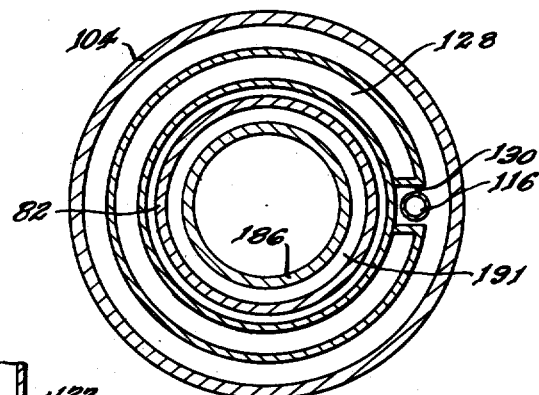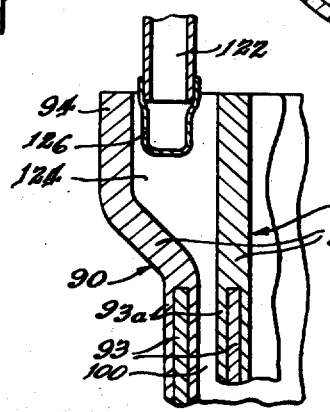

Feb. 23, 1960 W. H. McCORKLE 2,926,127
NEUTRONIC REACTOR WITH ACCESSIBLE THIMBLE
AND EMERGENCY COOLING FEATURES
Filed March 25, 1957 4 Sheets-Sheet 4
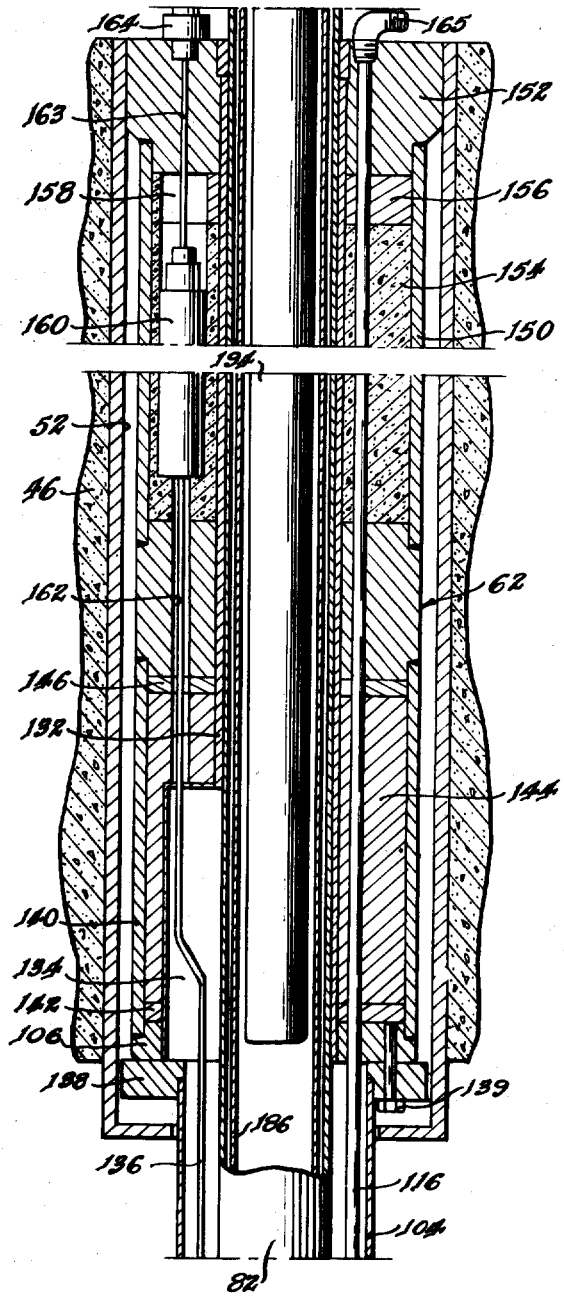
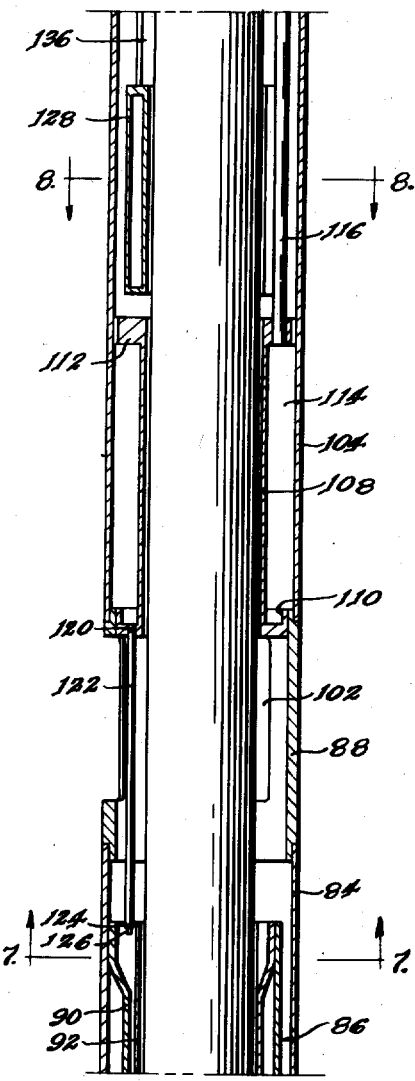
INVENTOR.
Willard H. McCorkle
BY
Attorney

United States Patent Office 2,926,127
Patented Feb. 23, 1960

2,926,127

NEUTRONIC REACTOR WITH ACCESSIBLE THIMBLE AND EMERGENCY COOLING FEATURES

Willard H. McCorkle, Hinsdale, Ill., assignor to the United States of America as represented by the United States Atomic Energy Commission Application March 25, 1957, Serial No. 648,449

4 Claims. (Cl. 204—193.2)

This invention relates to neutronic reactors, and more particularly, to an improved fuel rod and an emergency cooling system for a reactor of the type disclosed in the copending application of Jordan T. Weills et al., Serial No. 450,282, filed August 16, 1954.

Neutronic reactors operating at substantially high power levels cause energy to be stored in the reactor fuel assemblies in the form of radioactivity and delayed neutron emission which must be adequately controlled during its dissipation upon shutdown of the reactor. The fuel elements occupying the highest flux positions in the core of a neutronic reactor, such as disclosed in the above-referenced application, will dissipate approximately 19 kilowatts of stored energy in the form of heat at the time of shutdown after the reactor has been operating from 60 to 90 days at a power level of 4 megawatts. This is sufficient to cause the control rods to melt if it is not adequately controlled.

The heat produced in the fuel elements is caused after the chain reaction is stopped by the following:

(1) Fissions from delayed neutrons,
(2) Decay of radioactive fission products, and
(3) Decay of $U^{239}$ and $Np^{239}$.

The first item becomes insignificant within a few minutes after the reaction has stopped. The last item is an appreciable fraction of shutdown heating when the fuel elements used are fabricated with natural uranium. The referenced reactor uses fuel elements which are fabricated of enriched $U^{235}$; therefore the second item is the largest contributing factor. The rate of generation of heat by the radioactive decay of the fission products decreases exponentially with time after shutdown. However, this decrease is slow enough that a serious hazard could arise if some event occurred which permitted the moderator-coolant to be quickly lost from the reactor. At the 4 megawatt operating level of the referenced reactor, radiative cooling of the fuel elements would not be sufficient to prevent them from melting or becoming so hot that toxic fission products would diffuse out of the fuel rod materials. It is necessary that a coolant be supplied to the fuel assemblies for a period of 8 hours or longer after shutdown to prevent such hazards. It is therefore an object of this invention to provide an improved fuel rod and an emergency coolant system for a neutronic reactor to safeguard against the hazards of heat generated after shutdown of the reactor.

It is an object of this invention to provide a hollow fuel rod which will retain moderator-coolant in the fuel section of the elements at all times unless it is desired to remove it.

It is also an object of this invention to provide an emergency coolant system which will supply coolant to the fuel sections of the elements for a sufficient period of time after failure of the primary coolant system to permit repair of the primary system or to permit other arrangements to be made for continued cooling.

It is a final object of this invention to provide a fuel element which provides irradiation facilities within the fuel portion of the element itself which is especially rich in fast neutrons.

Other objects and advantages of the embodied invention will be readily ascertainable by a reading of the following description, especially with reference to the drawings, in which:

Figure 1 is a vertical sectional view of a portion of a neutronic reactor and a flow diagram representing the emergency coolant system embodied in the invention;

Figure 2 is an elevation of the fuel element for the neutronic reactor;

Figure 3 is a vertical sectional view of the lower part of the active fuel portion of the fuel rod illustrated in Figure 2;

Figure 4 is a vertical sectional view of the upper part of the active fuel portion above that of Figure 3;

Figure 5 is a vertical sectional view of a part of the fuel rod illustrated in Figure 2 which is disposed within the lower shield assembly above that portion shown in Figure 4;

Figure 6 is a vertical sectional view of the portion of the fuel rod illustrated in Figure 2 which is disposed within the upper shield assembly of the reactor above the portion shown in Figure 5;

Figure 7 is a horizontal sectional view taken along the line 5—5 of Figure 4, showing the arrangement of the fuel assembly;

Figure 8 is a horizontal sectional view taken along the line 8—8 of Figure 4;

Figure 9 is a fragmentary sectional view of a part of the fuel assembly.

The reactor shown in Figure 1 is essentially the same as that disclosed in the above-referenced copending Weills application, which utilizes a heavy water moderator, heavy water coolant, and $U^{235}$ fuel. The heavy water moderator-coolant is contained within a tank 20 and has been designated by the reference numeral 22. Fuel rods 24 are vertically mounted within the tank 20 and contain $U^{235}$ fuel for the neutronic chain reaction. The region 26 surrounding the sides and bottom of a tank contains solid neutron reflecting material, this material being graphite in the form of blocks in the reactor construction as described in the Weills application. A thermal shield 28 surrounds the region 26 and a concrete shield 29 surrounds the thermal shield 28. A layer of lead bricks 30 surrounds the thermal shield 28. The thermal shield 28 is water cooled, as described in the Weill application.

A mounting plate 32 is supported above the bottom of the tank 20 by an annular support member 34 which is sealed to both the tank 20 and the mounting plate 32. In this manner a plenum chamber 36 is formed, the only access to the interior of the tank 20 being formed through apertures 38 in the mounting plate 32 which are provided to accommodate the fuel elements 24, the fuel elements 24 forming a seal with the apertures 38. A coolant inlet pipe 40 extends through the shield 29, thermal shield 28, and region 26 of graphite to the plenum chamber 36, a coolant outlet pipe 41 extending from the bottom of the tank 20. An overflow pipe 42 is disposed within the tank 20, extending through an aperture 44 in the bottom thereof. There are two shield assemblies 46 and 48 directly above the tank 20. The lower shield assembly 46 is immediately adjacent to the tank 20 and the upper shield assembly 48 is spaced above the lower shield assembly 46 forming the access space 49. Both the upper shield assembly 48 and the lower shield assembly 46 are provided with channels 50 and 52, respectively, which are directly above corresponding apertures 38 in the mounting plate 32. Access ports 54 extend into the tank 20 and provide regions for the irradiation of materials. The reactor is provided with control arms 56 and a regulating control rod 58 which are constructed of neutron-absorbing materials such as cadmium or boron. The arms 56 pivot about a shaft 60 disposed adjacent to one end of each arm. The shafts 60 extend to the outside of the reactor to permit the operator to pivot the arms 56. The control rod 58 is disposed exterior to the fuel portion of the reactor and is used as a regulating control element to compensate for small changes in reactivity and changes of relatively short time duration.

The fuel rods 24 for the reactor are shown in detail in Figures 2 through 8. Each fuel element 24 has 3 regions, the lower region being designated an active region 62, the upper two regions 64 and 66 being designated shield regions corresponding to the lower and upper shields 46 and 48, respectively, of the reactor. The fuel rods 24 have a tip 68 (Figure 3) adjacent to the lower end of the active region which is provided with an aperture 70 located centrally thereof and has an outwardly extending centering member 72 positioned across the aperture 70 for the purpose of centering the fuel elements 24 in the apertures 38 in the mounting plate 32.

A sleeve 74 extends upwardly from the tip 68 to a spider-shaped centering member 76. Another spider-shaped centering member 78 is disposed within the hollow sleeve 74 above the tip 68 and is adapted to support a ball-check valve 80 in a centered position over the aperture 70. The aperture 70 is beveled to provide a liquid-tight connection with the ball-check valve 80 when the latter is in its lowermost position. A hollow truncated cone 81 is also supported by the centering member 78 and is adapted to direct a flow of fluid rising through the aperture 70 past the ball-check valve 80 and through the hollow cone 81 with a nozzle-like effect.

A thimble 82 comprising a hollow cylinder extending upward through the length of the rod 24 has its lower end 83 adapted to fit into an aperture 83a in the centering member 76. Another sleeve 84 extends upward from the centering member 76 enclosing fuel assembly 86 and joining another short sleeve section 88 (Figure 4) above the fuel assembly 86.

The fuel assembly 86 comprises a pair of concentric hollow fuel cylinders or elements 90 and 92 surrounding the thimble 82 (Figures 3, 4, and 7). Each of the elements 90 and 92 comprises a cylindrical core 93 fabricated of an alloy of aluminum and uranium clad with aluminum as indicated at 93a in Figure 9. The aluminum cladding 93a extends beyond the core 93 forming extensions 93b at the upper and lower ends of the fuel elements 90 and 92. The outer cylinder 90 is press fitted into the sleeve 84 (Figure 7) and spaced therefrom by means of outwardly extending flutes 94 formed in the extensions 93b at the upper and lower ends thereof to provide channels 96 between the fuel element 90 and the sleeve 84 for the flow of coolant. The inner fuel cylinder 92 is press fitted into the outer cylinder 90 and spaced therefrom by means of the outwardly extending flutes 98 formed in the extensions 93b at the upper and lower ends thereof to form channels 100 for the flow of coolant. The sleeve 84 is welded to the centering member 76 and the short sleeve 88, the fuel assembly 86 being readily removable from the rod by cutting away sleeve 84 with a lathe. A new sleeve containing another fuel assembly 86 may then be welded to the centering member 76 and the short sleeve 88.

The short sleeve 88 is provided with apertures 102 serving as discharge ports for the coolant flowing upward past the fuel assembly 86. A sleeve 104 extends from the short sleeve 88 upward to an annular member or flange 106 (Figure 5). Within the sleeve 104, and adjacent to the short sleeve section 88, is housed a tubular member 108 which loosely surrounds the thimble 82 (Figure 4). The tubular member 108 has a U-shaped channel 110 around its lower end abutting the inside surface of the upper end of the short sleeve 88 and a rim 112 around its upper end abutting the inside surface of the sleeve 104. The tubular element 108 forms a reservoir 114 with the sleeve 104 for emergency coolant introduced therein through a tube 116 connected thereto at the upper rim 112. Three tubes 122 extend downward from the channel 110 and have their lower ends each disposed within one of the channels 124 formed by the inner surfaces of the flutes 94 at the top of the fuel element 90. There is associated with each of the tubes 122, a U-shaped element 126 (Figure 9), the legs of which are attached to diametrically opposed portions of the lower end of the tube 122 and the base of which extends radially with respect to the axis of the fuel elements 90 and 92 in spaced relation to the lower end of the tube 122. Thus an emergency coolant flowing from the reservoir 114 downward through the tube 122 is fanned out within the channels 100 between the outer and inner fuel elements 90 and 92.

A float 128 (Figure 4) is disposed within the sleeve 104 above the tubular element 108 and is formed of an annulus fitting around the thimble 82 with recessed portion 130 (Figure 8) accommodating the emergency coolant tube 116. The float 128 is hollow so that it may follow the level of the coolant rising within the rod above the reservoir 114, the purpose for which will be hereinafter discussed.

The parts of the fuel rod 24 hereinbefore described in detail comprise the active region 62 of the fuel rod which is inserted into the tank 20 of the neutronic reactor and necessarily must be constructed of materials having an absorption cross section for thermal neutrons less than 10 barns, such as aluminum. The specifications for the fuel elements 90 and 92 are given in the following table:

TABLE I
*Specification for fuel elements*

| Overall Dimensions | Element 90 | Element 92 |
| --- | --- | --- |
| Length | 27 9/16 | 27 9/16 |
| Inside diameter | 2.516±.002 | 2.112±.002 |
| Outside diameter (at flutes) | 2.915±.002 | 2.511±.002 |

| CORE DIMENSIONS OF FUEL ELEMENTS 90 AND 92 | |
| --- | --- |
| Length | 25 13/16. |
| Thickness | .030±.001. |

| COMPOSITION OF FUEL ELEMENTS 90 AND 92 | |
| --- | --- |
| $U^{235}$ content total | 141.7 gms. |
| $U^{235}$ enrichment | 93.5%. |
| Total uranium in uranium-aluminum alloy | 24.14%. |

| CLADDING OF FUEL ELEMENTS 90 AND 92 | |
| --- | --- |
| Composition | 1,100 Aluminum. |
| Thickness | .015±.001. |

| DIMENSIONS OF SLEEVE 84 | |
| --- | --- |
| Length | 31 5/42. |
| Diameter—Outside | 3.000±.002. |
| Thickness | .040±.001. |
| Composition | 1,100 Aluminum. |

Along the lower shield region 64 of the fuel rod 24 (Figure 5) a stainless steel sleeve 132 surrounds the thimble 82. A rectangular housing 134 is formed by the stainless steel sleeve 132 in its lower portion which is positioned and adapted to receive a rod 136 extending upward from the float 128. A stainless steel ring 138 surrounds the bottom end of the sleeve 132 to which is fastened flange 106 by means of bolts 139. The ring 138 receives an upward extending sleeve 140 which is welded thereto. A "boral" ring 142 surrounds the sleeve 132 within the outer sleeve 140 above the stainless steel ring 238, "boral" being a heterogeneous mixture of equal amounts of boron carbide ($B_4C$) and aluminum. A layer of lead 144 is disposed above the "boral" liner 142 between sleeves 132 and 140 and is capped by a second "boral" ring 146. Above the second "boral" ring 146 is a stainless steel ring 148 which is welded at its lower end to the upper end of sleeve 140 and at its upper end to the lower end of a stainless steel sleeve 150. A stainless steel plug 152 is welded to the upper end of the stainless steel sleeve 150. A layer of concrete 154 is disposed above the stainless steel ring 148 between the sleeves 132 and 150 and a layer of lead 156 is disposed between the layer of concrete 154 and the stainless steel plug 152. Within the layers 154 and 156 is a cavity 158 in which a differential transformer 160 is positioned. The concrete layer 154, the stainless steel ring 148, "boral" liner 146, and the lead layer 144 are provided with a channel 162 which is adapted to receive the rod 136 extending from the float 128 to the differential transformer 160. An electrical connection 163 is provided between the differential transformer 160 and a female plug 164 at the top of the lower shield portion 64. The emergency coolant tube 116 extends upward through the lower shield portion 64 terminating in a standard elbow joint 165. The lower shield portion 64 comprising the layers of lead 144 and 156, the concrete layer 154 and the "boral" rings 142 and 146 absorbs nuclear radiations which might otherwise escape through the channels 52 (Figure 1) in the lower shield 46 of the reactor.

In the upper shield portion 66 (Figure 6) an inner sleeve 166 of stainless steel surrounds the thimble 82 and is connected to a stainless steel ring 168 at its bottom end which is spaced above the cap 152 of the lower shield region 64. An outer sleeve 170 of stainless steel is welded to the ring 168 at its lower end and a layer of concrete 171 is disposed between the sleeves 166 and 170. Sleeve 170 is welded to a stainless steel cap 172 at its upper end, the cap 172 receives seal rings 174 providing a liquid tight seal between the channel 50 and the upper shield portion 66. The upper shield portion 66 comprising the layer of concrete 171 serves to absorb any gamma radiation which may have passed through the lower shield portion 64. An electrical connection 182 having a male plug 183 at its lower end adapted to fit into female plug 164 (Figure 5) extends upward therefrom through the upper shield portion 66 to a meter (not shown) capable of measuring electrical currents transmitted to it.

The cap 172 (Figure 6) is provided with an aperture 184 which receives the upper end of the thimble 82. A hollow sleeve or thimble liner 186 is adapted to fit within the thimble 82 and has its bottom end extending to the bottom of the fuel assembly 86 (Figure 3). The thimble liner 186 is held within the thimble 82 at its upper end by means of a ring 188 which fits on a shoulder 190 provided within the aperture 184 in the cap 172. The thimble liner 186 is in spaced relationship with the thimble 82 throughout its length forming an interstice 191 therebetween and is provided with holes 192 in its lower portion co-extensive with the fuel assembly 86. A plug 194 for preventing the escape of neutronic particles or radiations is disposed in spaced relationship within the thimble liner 186 extending the length of the upper and lower shield portions of the rod and forms an interstice 197 between the plug 194 and the inside of the thimble liner 186. A cap 198 of the plug 194 is space dabove the ring 188 so that air supplied through air opening 200 may pass into the thimble liner 186 through the interstice 197 to the lower portion of the thimble liner where it passes through the holes 192 and upward through the interstice 191 and out through to the air outlet at 202. The above described arrangement of the thimble 82, its plug 194 and the thimble liner 186 permits samples placed in the thimble liner 186 for irradiation in the strong fast neutron flux to be cooled independently from the liquid cooling of the reactor. It is to be noted that the thimble liner 186 is readily removable from the fuel rod 24 by being extracted through the aperture 184 in the cap 172, thereby facilitating the handling of samples in the thimble.

The primary and secondary coolant systems for the neutronic reactor are shown in Figure 1. In the primary coolant system, the $D_2O$ enters the plenum chamber 36 from the coolant inlet pipe 40. The $D_2O$ enters each rod 24 through the aperture 70 and the tip 72 (Figure 3) and is forced upward past the fuel assembly 86 along both the inside and outside surfaces of the fuel elements 90 and 92. The $D_2O$ flows out of the fuel rods 24 through the discharge ports 102 and into the tank 20 of the reactor. The $D_2O$ flows out of the tank 20 through the coolant outlet pipe 41 along pipe 204 to a primary coolant pump 206. From the discharge end of the pump 206 the $D_2O$ coolant enters a heat exchanger 208; it is then returned to the reactor through pipe 210 and the coolant inlet pipe 40. If the level of the $D_2O$ coolant rises in the tank 20 above the opening of the overflow tube 42, the excess will be discharged through the overflow tube 42 into the primary coolant system. The float 128, which is mechanically connected to the differential transformer 160 as hereinbefore described, serves to measure the rate of the coolant flow through the fuel rod 24 into the tank 20. The flow of the coolant through the rod 24 upward and through the discharge ports 102 under pressure causes a pressure head to be formed in the rod 24, the coolant flowing upward through the space between the tubular element 108 and the thimble 82 (Figure 4) causing the float 128 to seek the level of pressure head within the rod. The upward pressure on the coolant in the rod will cause the level in the rod to be somewhat higher than the level of the coolant in the tank 20 outside of the rods 24. The differential transformer 160 transmits an electric current which is a function of the level of the coolant within the rod 24 to a meter which will compare it to a reading of the level of the coolant in the tank 20 outside of the rod and transpose the difference of the readings into a measurement of the flow rate of coolant in the rods.

The $D_2O$ coolant for the emergency system is taken from the primary system pipe 210 leading from the discharge end of the heat exchanger 208 by means of pipe 212. The emergency coolant is fed into a tank 214 which is situated above the level of the reactor so that the coolant may be gravity fed into the reactor tank 20. A helium-venting line 216 extends from the top of the tank 214 down to a storage tank 218 to prevent a pressure buildup in the tank 214. An overflow tube 220 is connected to the tank 214 at a predetermined level and has its discharge end in the reactor tank 20. The emergency coolant flows from the tank 214 through a pipe 222 into a manifold 224 wherein it is distributed to separate pipes 226 which are connected to elbow joint 165 on each of the fuel rods 24 in the access space 49. The coolant flows downward through the emergency coolant tube 116 in the lower shield portion 64 of the fuel rod 24 and into the reservoir 114. If the flow of primary fluid discontinues and the level of the coolant in the tank 20 falls below the fuel assembly 86 it will continue to be cooled as the emergency coolant in the reservoir 114 discharges through the tubes 122 into the channels 100 between the outer and inner fuel elements 90 and 92, the U-shaped elements 126 serving to spread the flow of the coolant within the channels.

The tank 214 will furnish emergency coolant to the fuel rods 24 at a sufficient rate to prevent meltdown of the fuel assembly 86 for a period of approximately 20 minutes during which time the malfunction of the primary coolant system can be repaired. If the correction cannot be made to the primary coolant system in that time, an emergency pump 228 operable either mechanically or manually may be employed to feed coolant from an additional source 230 into the emergency coolant system pipe 212.

The man skilled in the art will readily devise many other objects and advantages for the present invention and may make modifications to the specific apparatus hereinabove described. It is therefore intended that the scope of the present invention be not limited except insofar as set forth in the appended claims.

What is claimed is:

1. A liquid moderated neutronic reactor, comprising a vertically extending hollow rod having at least one fuel element disposed therewithin adapted to permit passage of coolant through the inside of the hollow rod, a plenum chamber adjacent the bottom of said rod, a unidirectional valve connecting the plenum chamber to the rod to permit passage of coolant only from the plenum chamber into the rod, at least one port for discharging the coolant from the rod above the fuel element, a reservoir chamber positioned in the rod above the discharge port, discharge tubes connected to the bottom of the reservoir chamber and extending below the discharge port for flowing coolant over the fuel element; a reservoir tank connected to the reservoir chamber, said reservoir tank being at a substantial height above the reservoir chamber to maintain a substantial pressure on the coolant within the reservoir chamber, pumping means for flowing coolant into the plenum chamber and into the reservoir tank and additional pumping means for continuing the flow of coolant into the reservoir tank in case of failure of the first pumping means.

2. A fuel rod for use in a liquid moderated neutronic reactor, comprising sleeve means, a first tubular fuel element concentrically disposed within the sleeve means and having three outwardly extending hollow protuberances equally spaced around its upper and lower ends, said protuberances spacing the fuel element from said sleeve means, a second tubular fuel element concentrically disposed within the first fuel element and having three outwardly extending hollow protuberances equally spaced around its upper and lower ends, said protuberances of the second fuel element spacing the second fuel element from the first, an annular reservoir positioned above the fuel elements within the sleeve means, three tubes connected to the reservoir and having their discharge ends positioned in the protuberances on the upper end of the first fuel element, a U-shaped element diametrically positioned on the discharge end of each of the tubes along a radial line of the first and second fuel elements, a one-way valve at the bottom end of the sleeve means to permit coolant to be introduced therein, at least one aperture in the side of the sleeve means positioned between the fuel elements and the reservoir for discharging the coolant from the fuel rod, and means for introducing coolant into the reservoir, whereby coolant may continue to circulate by the fuel elements if the flow of coolant through the unidirectional valve is insufficient to circulate coolant thereby.

3. A fuel rod as described in claim 2, comprising in addition, a shield portion above the reservoir and having an aperture therethrough, a liquid tight irradiation thimble disposed concentrically within the sleeve means, its lower end extending through the aperture in the shield portion and through the annular reservoir into the hollow portion of the second fuel element, the upper end of said thimble extending above the shield portion the interior of said thimble being accessible through said upper end, a perforated liner removably positioned in the thimble forming an air space between the liner and the thimble.

4. A liquid moderated nuclear reactor comprising a plurality of fuel rods, each of said fuel rods comprising sleeve means, a first tubular fuel element concentrically disposed within the sleeve means and having three outwardly extending hollow protuberances equally spaced around its upper and lower ends, said protuberances spacing the fuel element from said sleeve means, a second tubular fuel element concentrically disposed within the first fuel element and having three outwardly extending hollow protuberances equally spaced around its upper and lower ends, said protuberances of the second fuel element spacing the second fuel element from the first, an annular reservoir positioned above the fuel elements within the sleeve means, three tubes connected to the reservoir at its lower end and having their discharge ends positioned in the protuberances on the upper end of the first fuel element, a U-shaped element diametrically positioned on the discharge end of each of the tubes along a radial line of the first and second fuel elements, a unidirectional valve at the bottom end of the sleeve means to permit coolant to be introduced therein, at least one aperture in the side of the sleeve means positioned between the fuel elements and the reservoir for discharging the coolant from the fuel rod; a plenum chamber connected to the unidirectional valve at the bottom end of each of said fuel rods; a reservoir tank connected to the reservoir chamber and positioned at a substantial height above the reservoir chamber to maintain a substantial pressure on the coolant within the reservoir chamber; pumping means for continuously flowing coolant into the plenum chamber and into the reservoir tank, and additional pumping means for continuing the flow of coolant into the reservoir tank in case of failure of the first pumping means.

References Cited in the file of this patent

UNITED STATES PATENTS

| 2,743,224 | Ohlinger | Apr. 24, 1956 |
| 2,743,226 | Newson | Apr. 24, 1956 |
| 2,810,689 | Wigner et al. | Oct. 22, 1957 |

FOREIGN PATENTS

| 56,382 | France | July 16, 1952 |
| | (Addition to No. 999,330) | |
| 754,559 | Great Britain | Aug. 8, 1956 |

OTHER REFERENCES

Proceedings of the International Conference on the Peaceful Uses of Atomic Energy, August 8–20, 1955; United Nations, N.Y.; vol. 2, pages 437, 444 (paper by Kruzhilin); vol. 2, pages 456, 457, 460, 469 (paper by Zinn); vol. 2, pages 454 (paper by Grout et al.); vol. 3, pages 252, 254–257 (paper by Harrer et al.).

Westinghouse Engineer, vol. 16 (No. 5, September 1956), pages 140–142.